United States Patent [19]

Vero

[11] Patent Number: 5,042,169
[45] Date of Patent: Aug. 27, 1991

[54] INTERSTAGE SEPARATOR

[75] Inventor: Gregory M. Vero, Camberwell, Australia

[73] Assignee: Exxon Chemical Patents Inc., Linden, N.J.

[21] Appl. No.: 510,435

[22] Filed: Apr. 18, 1990

[51] Int. Cl.⁵ .............................................. F26B 17/00
[52] U.S. Cl. ...................................... 34/57 E; 34/10; 55/417; 55/431; 55/466; 406/173
[58] Field of Search ................. 34/57 R, 57 E, 85, 10; 406/173; 55/431, 466, 417

[56] References Cited

U.S. PATENT DOCUMENTS

| | | |
|---|---|---|
| 2,436,355 | 2/1948 | Cadot et al. |
| 2,458,357 | 1/1949 | Evans |
| 3,195,241 | 7/1965 | Hohne ...................................... 34/10 |
| 3,265,775 | 8/1966 | Friedrich |
| 3,384,420 | 5/1968 | Fiscus |
| 3,629,951 | 12/1971 | Davis et al. |
| 3,766,661 | 10/1973 | Bayens et al. ................... 34/57 E X |
| 4,076,493 | 2/1978 | Gardner |
| 4,189,299 | 2/1980 | Bourne |
| 4,231,991 | 11/1980 | Muller |
| 4,365,057 | 12/1982 | Saito et al. |
| 4,441,261 | 4/1984 | Beckmann |
| 4,599,016 | 7/1986 | Medemblik |
| 4,736,527 | 4/1988 | Iwamoto et al. .................... 34/57 E |

Primary Examiner—Edward G. Favors
Attorney, Agent, or Firm—M. L. Gibbons

[57] ABSTRACT

An interstage separator for transferring polymeric crumb from a first stage pneumatic conveyor with hot wet air, to a second stage pneumatic conveyor with cool dry air. The interstate separator is characterized by a tangential inlet for the crumb, and an enclosed separating chamber within which the crumb is separated from the first stage air stream. A transition member associated with the separator directs the crumb into a second stage air stream and, then, to a second stage pneumatic conveyor. The interstage separator transfers the rubber crumb from the first stage air stream to the second stage air stream without fouling of the associated equipment.

12 Claims, 5 Drawing Sheets

INTERSTAGE SEPARATOR

CROSS REFERENCE TO RELATED APPLICATION

The present application is related to applicant's co-pending patent application, filed simultaneously herewith, which is directed to a two-stage process for rubber cooling. The subject matter of the present application is directed to the interstage separator in conjunction with which the process is utilized.

BACKGROUND OF THE INVENTION

1. Field of the Invention

The invention pertains generally to an interstage separator for transferring hot rubber crumb from a hot, wet first stage air stream to a cool, dry second stage air stream.

A typical dewatering and drying process for rubber crumb involves utilizing an extruder discharging to a pneumatic conveying system. The rubber particles are cooled in the conveying system, and are thence conveyed to and discharged onto an enclosed vibrating conveyor or fluidized bed conveyor. The rubber particles are further cooled down to baling or packaging temperature requirements in the vibrating conveyor or fluidized bed conveyor, being subsequently transported via a series of open vibrating conveyors to a baling or packaging area.

The level to which the rubber crumb is able to be cooled in the pneumatic conveying system is limited by the saturation temperature of the air and steam mixture in the pneumatic conveying system. Lowering of the air temperature below the saturation temperature of the wet hot air in the pneumatic conveying system in an effort to obtain additional cooling of the rubber crumb results in the product being undesirably wetted by the free water which is formed. Hence, it is necessary to direct the rubber crumb to the enclosed vibrating or fluidized bed conveyor for further cooling as previously noted.

The cooling limitations imposed in existing pneumatic conveyor systems, together with the peculiar properties of the rubber crumb, give rise to problematic deficiencies culminating in system performance and quality concerns. Because the rubber particles entering the enclosed vibrating conveyor or fluidized bed conveyor from the pneumatic conveyor are still hot, the particles agglomerate, thereby causing fouling of the equipment downstream of the pneumatic conveyor. Additionally, the hot rubber which causes the fouling tends to degrade and break away, resulting in contamination of the product. Moreover, the rubber agglomerations cause weight-control irregularities in the baling or packaging area.

Thus, the need exists for a process which allows cooling of the dried rubber crumb in an elastomeric polymer drying and cooling system to temperatures lower than those presently achievable with conventional systems, prior to presentation of the rubber crumb to conveying, baling or packaging stations. Applicant's co-pending patent application, filed simultaneously herewith, provides a process which realizes the latter objective by providing a method wherein rubber crumb is transferred from the water-saturated hot air stream of a first pneumatic conveyor, to a cool, dry air stream in a second pneumatic conveyor. Once the rubber particles are introduced into the cool dry air in the second pneumatic conveyor, the particles are subject to additional cooling over that which is able to be obtained in the first pneumatic conveyor. Indeed, the rubber particles may be cooled in the second pneumatic conveyor to such an extent that the enclosed vibrating conveyor or fluidized bed conveyor may be entirely eliminated.

The invention of the present application is directed to an interstage separator for transferring hot rubber crumb from a first stage pneumatic conveyor containing a hot, wet first stage air stream, to a second stage pneumatic conveyor containing a cool, dry second stage air stream. The invention accomplishes the preceding objective while avoiding agglomeration of and sticking of the rubber crumb in the interstage separator.

2. Description of the Prior Art

It is known in the prior art to separate particles from an air stream. For example, U.S. Pat. No. 4,599,016, issued on July 8, 1986 to Medemblik, is directed to a cyclone apparatus for separating granular matter from an air stream.

It is also known in the prior art to cause a product to be contacted by a counterflowing reaction or cooling gas. Exemplary of this teaching is U.S. Pat. No. 4,441,261, issued on Apr. 10, 1984 to Beckmann. Beckmann discloses a cooling apparatus to which red-hot coke is introduced and wherein two cooling gas streams combine with each other at the upper end of the apparatus. The cooling gas streams are supplied to the apparatus through gas distributors proximate its lower end and are directed in a direction opposite to that of the flowing coke material.

Similarly, U.S. Pat. No. 4,365,057, which issued to Saito et al on Dec. 21, 1982, teaches a drying machine to which nitrogen gas is supplied at the lower part thereof, and ascends in the machine in counterflow to a descending hydrocarbon medium.

U.S. Pat. No. 4,231,991, issued to Mueller on Nov. 4, 1980, shows a crystallization apparatus to which is admitted a granular amorphous material. The material descends by gravity in counterflow to a hot gas admitted to the lower portion of the apparatus.

U.S. Pat. No. 4,189,299, issued on Feb. 19, 1980 to Bourne, discloses a cooling tower for receiving hot lime. Cool air is drawn into the cooling tower near its bottom, flows up through the falling lime and is pulled into dust deparators near the top of the tower.

Gardner, U.S. Pat. No. 4,076,493 dated Feb. 28, 1978, shows an upright shell which is adapted to contain sintered particulate material to be cooled, and air distributing means arranged within the lower portion of the shell for releasing cooling air into the material.

U.S. Pat. No. 3,629,951, issued to Davis et al on Dec. 28, 1971, is directed to a spray tower wherein a hot air duct passing to a plenum is provided at the lower end of the tower for distributing hot air into the tower.

U.S. Pat. No. 3,265,775, issued on Aug. 9, 1966 to Friedrich, discloses a stand pipe and funnel apparatus having a lower inlet conduit for admission of treatment gas for upward flow into the stand pipe.

A contact gas reaction means is shown in U.S. Pat. No. 2,458,357, which issued on Feb. 19, 1944 to Evans. Evans illustrates a regeneration vessel confining a contact material, and to which cold air is provided for both upward and downward flow within the vessel.

Finally, U.S. Pat. No. 2,436,355, issued on Feb. 17, 1948 to Cadot et al is directed to a spray-drying chamber into which hot air is drawn. Additionally, auxiliary cold air is forced into the chamber through annular rings at the top and bottom.

The prior art fails to teach or suggest an interstage separator particularly adapted to transfer hot rubber crumb from a hot wet first stage air stream to a cool dry second stage air stream without fouling of the associated equipment, and contamination or degradation of the product, and which minimizes entrained first stage vapor in the second stage stream. Additionally, the prior art reflects a series of counter current flow devices. The present invention, on the other hand, is representative of co-current flow relative to the second stage air stream and solids.

SUMMARY OF THE INVENTION

The invention relates to an interstage separator for separating hot rubber crumb from a wet hot first stage air stream, and for transferring the separated hot rubber crumb to a cool dry second stage air stream without fouling of the associated equipment and without contamination or degradation of the rubber crumb product.

The interstage separator includes a body member having a tangential inlet at its upper end for receiving a mixture of hot rubber crumb and hot wet first stage air from a first stage pneumatic conveyor. The body member defines a separating chamber within which the hot rubber crumb is centrifugally separated from the first stage air stream. The lower end of the body member forms a solids discharge, around which a transition member is fitted in spaced relation so as to form an annular opening. Cool dry second stage air is introduced through a second stage air inlet provided in the transition member in communication with the annular opening so as to pick up the separated hot rubber crumb which exits from the solids discharge, transferring the rubber crumb in the second stage air stream to a second stage pneumatic conveyor. The first stage air is adapted to be exhausted from the interstage separator. The interstage separator is adapted to be jacketed for cooling.

DETAILED DESCRIPTION OF THE PREFERRED EMBODIMENT

Figure 1:
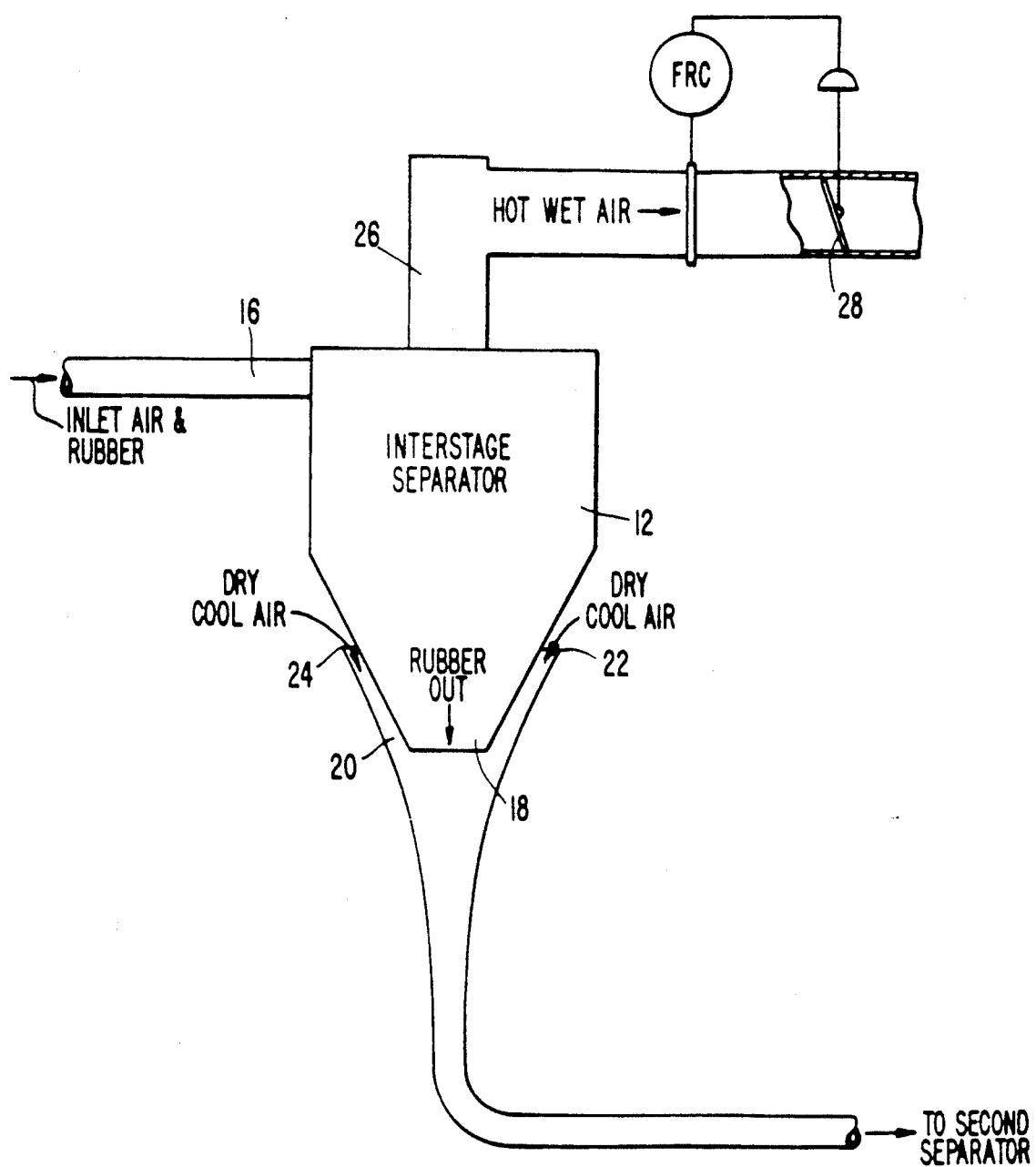
FIG. 1 is a schematic depicting the interstage separator as it is utilized in a two-stage cooling process for rubber crumb.

The interstage separator of the present invention is adapted to be utilized in conjunction with a two-stage process for cooling rubber crumb. The dewatering and drying operations for rubber crumb typically include passing crumb slurry from a solvent stripping section over a dewatering screen, to a dewatering screw press, and thence to a drying extruder. At the discharge of the drying extruder, water contained in the rubber flashes as steam, and is combined with air in a rotary cutter installed at the discharge of the drying extruder in order to prevent recondensation of the water on the dry crumb. The rotary cutter is a variable die device which allows discharge of the crumb to a pneumatic conveying system. Because the degree of cooling for the rubber crumb which is obtainable in the pneumatic conveying system is limited by the saturation temperature of the air contained therein, the pneumatic conveying system discharges, in turn, to an enclosed vibrating conveyor or fluidized bed type conveyor, usually through a cyclone separator. The rubber crumb is then further cooled in the vibrating or fluidized bed conveyor down to baling or packaging temperatures. The fluidized bed conveyor is typically positioned to afford entry of the cooled rubber crumb to a baler or packaging station.

As discussed in applicant's co-pending, related patent application, the foregoing procedure is characterized by certain critical drawbacks, including the sticking of the hot fine rubber particles to the metal surfaces in the fluidized bed conveyor, and the excessive manpower and downtime required to correct the latter condition by cleaning the equipment. Additionally, the rubber particles agglomerate in the vibratory or fluidized bed conveyors, resulting in irregularities in bale weight due to lumps of fines. Further disadvantages include free water accumulation on lumps of fines, product loss in the exhaust air from the fluidized bed conveyor, and insufficient crumb cooling in the pneumatic conveyor.

The instant invention teaches an interstage separator for utilization in a closed finishing process which effectively addresses and overcomes the enumerated deficiencies. The process broadly contemplates a rotary cutter installed at the discharge of the drying extruder, to which air from a blower is introduced to prevent recondensation of steam on the dry crumb particles received therein. From the cutter the rubber crumb and air are transferred to a first stage pneumatic conveyor. The rubber crumb is then pneumatically conveyed to the interstage separator in the first stage air stream.

The rubber which enters the drying extruder generally contains about 5 to about 10% by weight of volatile matter. The rubber-water mixture is heated in the extruder by mechanical work just upstream of the extruder die. However, the sudden release of pressure which occurs as the wet rubber passes through the extruder die plate causes rapid vaporization of the water contained in the rubber, whereby heat is transferred from the rubber to the water so as to achieve some drying and cooling of the rubber. The water evaporated at the extruder die is mixed with the conveying air for the first stage pneumatic conveyor. Additional heat is removed from the rubber-water mixture in the first stage pneumatic conveyor by means of natural convection cooling or, additionally, by the utilization of a cooling jacket. Together, these cooling mechanisms determine the temperature of the rubber crumb entering the interstage separator.

The degree to which the rubber is able to be cooled in the first stage pneumatic conveyor is limited by the saturation temperature of the air and steam mixture, being determined by the requirement that the exit air temperature for the first stage pneumatic conveyor be maintained at about 45° to about 60° C. for about 6 to about 10% of water evaporated off the rubber at the extruder die, so as to prevent saturation of the air and consequent condensation from the air onto the rubber.

The two-stage process allows for further cooling of the rubber crumb, over that normally obtainable in the first stage pneumatic conveyor, by transferring the rubber crumb from the hot wet first stage air stream of the first stage pneumatic conveyor to a second stage cool dry fresh air stream of a second stage pneumatic conveyor by means of the interstage separator.

Figure 2:
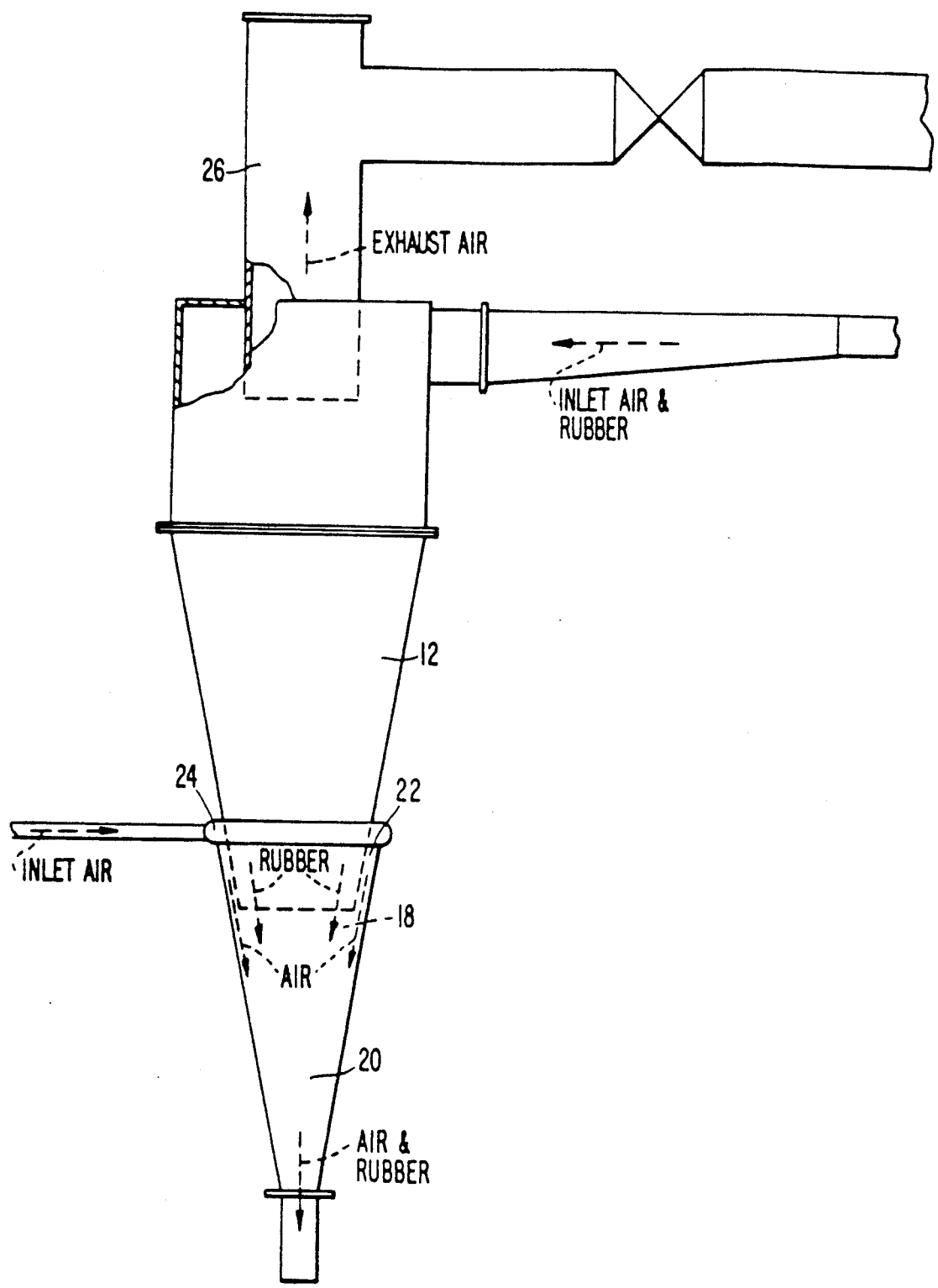
FIG. 2 is a plan view of the interstage separator.

The basic operation of the interstage separator, as it relates to cooling rubber crumb, can best be described with reference to FIGS. 1 and 2. As can be seen therein, the interstage separator 12, comprises a vertically oriented body defining an enclosed separating chamber having an upper end and a lower end. A tangential first stage inlet 16 is provided at the upper end, and a solids discharge 18 is provided at the lower end. A cone-shaped transition member 20 is disposed around the periphery of the lower end, proximate the solids discharge, in spaced relation thereto, so as to define an annular opening 22 between the transition member and the exterior surface of the solids discharge. The transition member is provided with a second stage air inlet 24. The first stage inlet communicates with a first stage pneumatic conveyor, and the second stage air inlet communicates with a source of cool dry second stage air. The upper end of the interstage separator communicates with an exhaust passage 26, which is provided with valve means 28.

The hot rubber crumb particles are introduced into the interstage separator 12 while fully entrained in the first stage wet, hot air stream of the first stage pneumatic conveyor. Within the separating chamber of the interstage separator, the rubber particles experience a downward helical motion in approaching the solids discharge 18, being separated therein from the first stage air. The second stage air inlet introduces the cool, dry fresh air of the second stage. The cool dry air enters the annular opening so as to pick up the separated hot rubber particles as they exit from the solids discharge of the interstage separator, carrying them to the second stage pneumatic conveyor in the second stage air stream for further cooling in accordance with the above-described process.

The annular opening is such that the cool dry second stage air is introduced into the annular opening 22 so as to be evenly distributed therein. Consequently, the high air velocity of the cool dry second stage air along the walls of the transition member prevents the transition member from experiencing undesirable fouling of its walls. Additionally, sticking of the rubber particles to the transition member may be further inhibited by coating the transition member with a non-stick material such as Teflon.

The interstage separator is subject to a slight positive pressure. Thus, pressure drop in the second stage pneumatic conveyor backpressures the interstage separator, forcing the first stage wet hot air to exit the interstage separator via the exhaust passage 26. The exhaust rate is adapted to be regulated by means of the valve means 28 to be equal to or less than the rate of input of the first stage air to the interstage separator. The interstage separator and transition member result in about 99 percent of the rubber crumb, along with leakage of only about 10 to about 20% of the first stage air, entering the second stage pneumatic conveyor. If insufficient pressure is available to achieve an adequate exhaust rate for the first stage air, a suction device may be provided at the interstage separator exhaust 26 to control the exhaust rate of the first stage air.

The interstage separator is characterized by a vortex, whereby some first stage air is always flowing proximate the solids discharge in the region where fouling would normally occur due to low velocities. Furthermore, the annular opening 22 is specifically designed to evenly distribute the second stage air around the periphery of the solids discharge of the interstage separator at adequate conveying velocities.

A preferred embodiment for the interstage separator and transition member is shown in FIGS. 3-6. The interstage separator comprises a vertically oriented elongated centrifugal separator chamber defined by a first body member 30 having an enclosed upper end 32, and a generally cone-shaped open lower end 34. The first body member defines a separating chamber 35. The upper end of the first body member is provided with a tangential first stage inlet 36 adapted to communicate with a first stage pneumatic conveyor. The first body member 30 is surrounded by a second exterior body member 38, which extends generally from the upper end 32 to the lower end 34 of the first body member, and which is spaced from the first body member so as to provide a gap 40 therebetween. The second body member 38 forms a jacket around the first body member, with cooling means intended to be introduced into the gap 40 through cooling fluid inlets 42.

Figure 3:
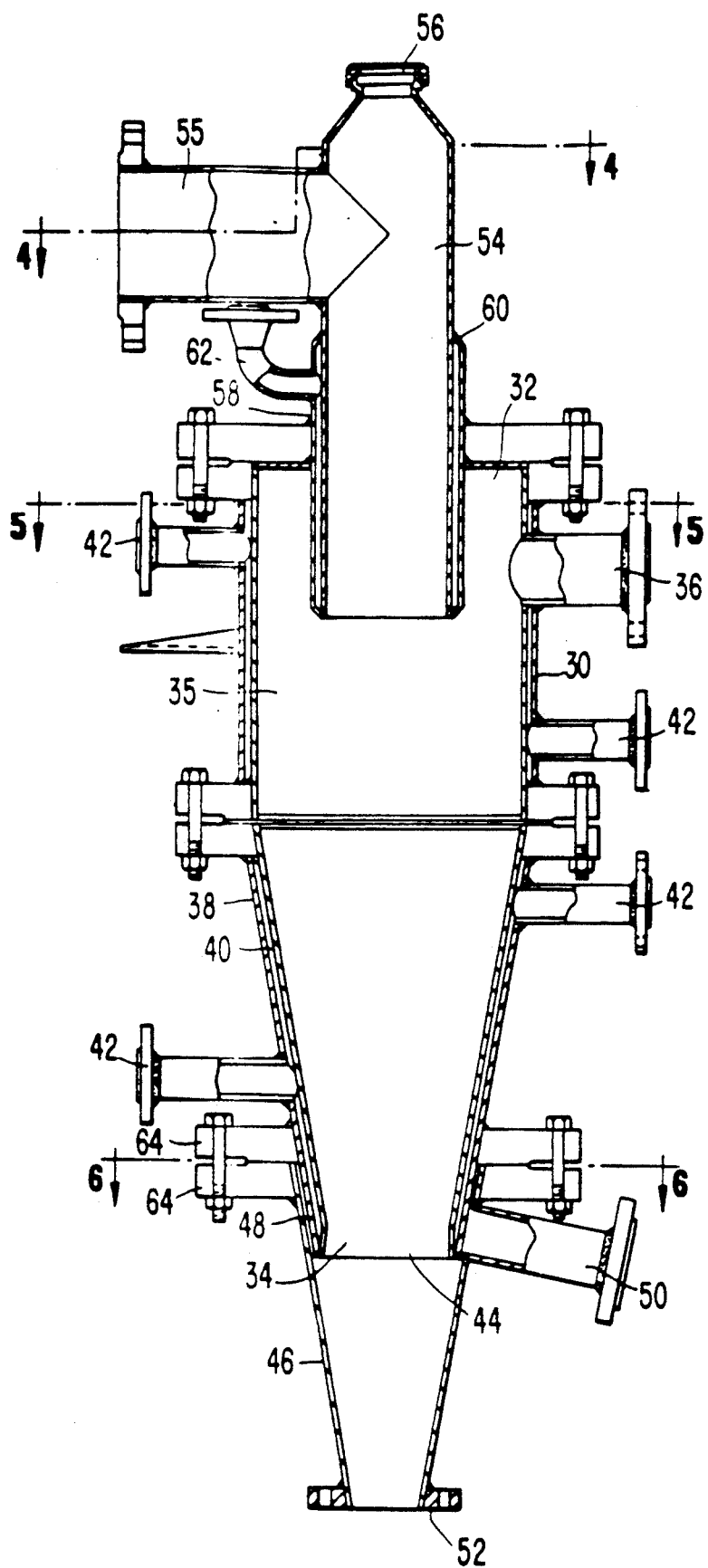
FIG. 3 is a front sectional view of a preferred embodiment for the interstage separator and transition member.
Figure 4:
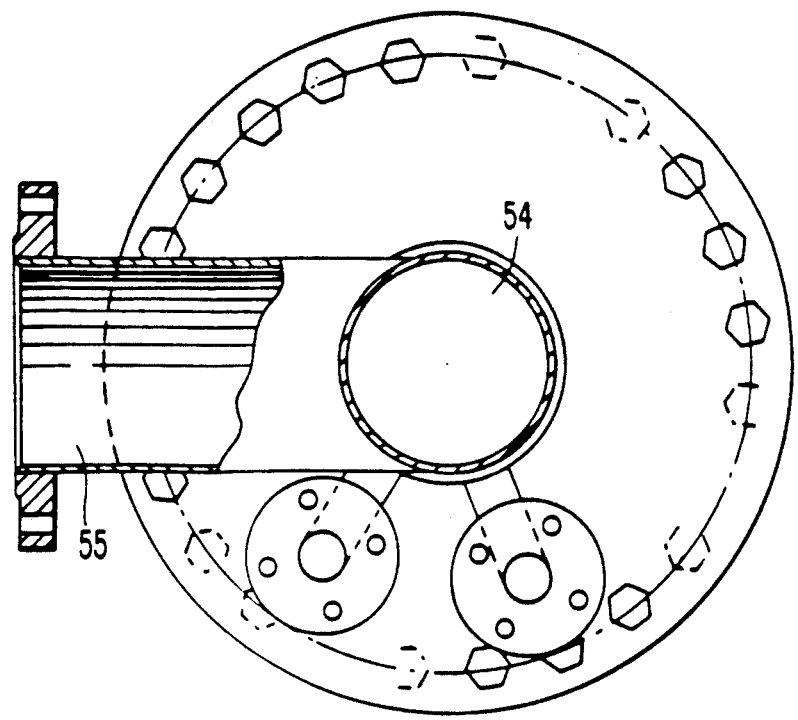
FIG. 4 is a combination partial top plan view and top sectional view of the interstage separator, taken along line 4—4 of FIG. 3.
Figure 5:
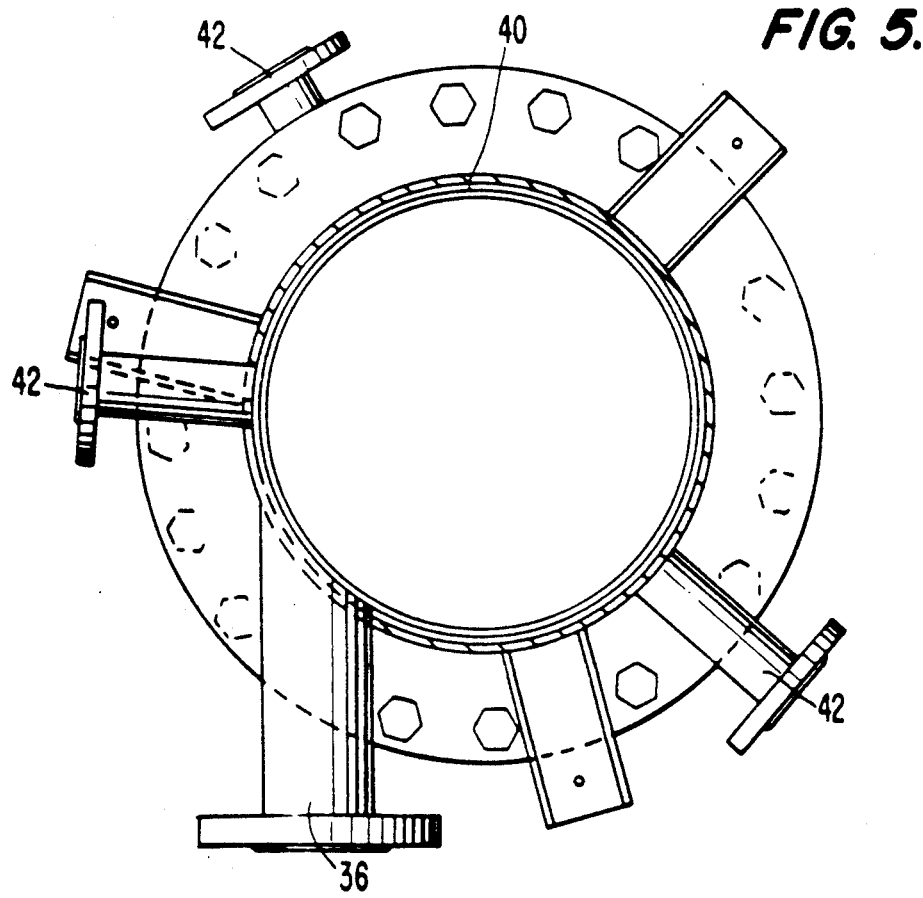
FIG. 5 is a top plan view of the interstage separator, taken along line 5—5 of FIG. 3.
Figure 6:
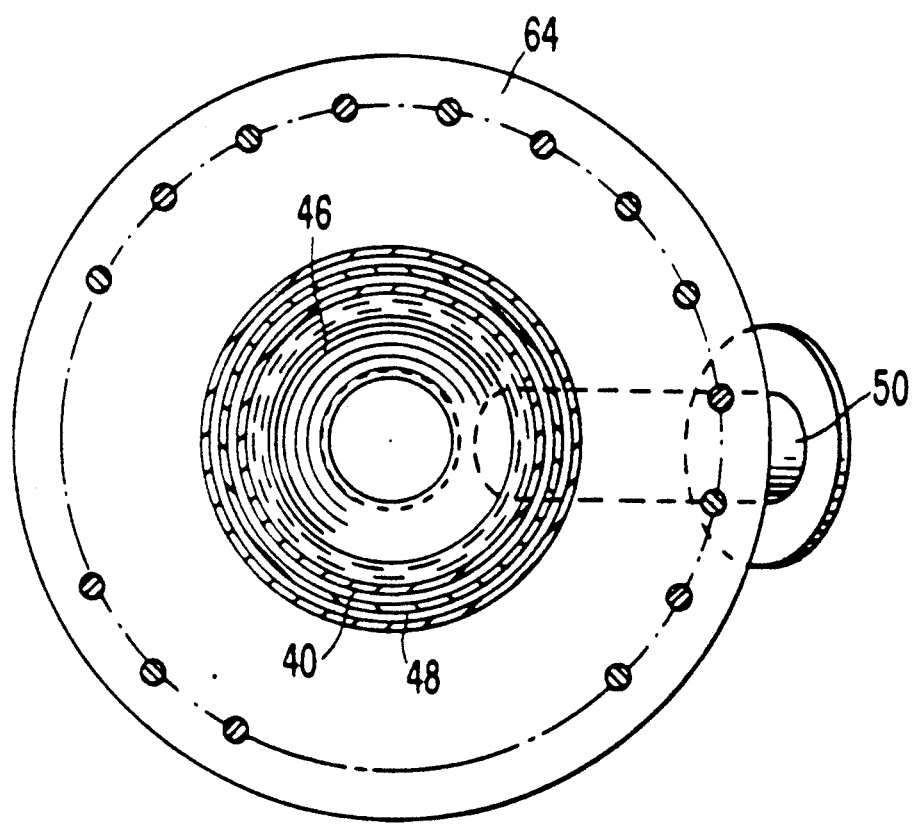
FIG. 6 is a top plan view of the transition member, taken along line 6—6 of FIG. 3.

The open lower end 34 of the first body member terminates in a solids discharge 44. As can be seen in FIG. 3, the second body member 38 similarly terminates at its lower end to coincide with the solids discharge 44. A generally cone-shaped transition member 46 is provided at the lower end of the interstage separator. With reference to FIG. 3, it can be seen that the transition member surrounds the periphery of the lower end of the second exterior body member proximate the solids discharge in spaced relation thereto. Thus, the transition member encompasses the lower end of the second exterior body member where the second body member surrounds the lower end of the first body member. The transition member is spaced with respect to the lower end of the second body member so as to define an annular opening 48. The transition member is provided with a second stage inlet 50 which communicates with annular opening 48, and which is adapted to accept a stream of cool dry air from a suitable source. The bottom end 52 of the transition member is intended to communicate with a second stage pneumatic conveyor.

The top end of the first body member communicates with an exhaust passage 54, and exhaust conduit 55 which is provided with a viewport 56. The lower end of the exhaust passage is provided with an external sleeve 58 in spaced relation to the lower end of the exhaust passage so as to form a gap 60 for receiving cooling fluid through cooling fluid inlet 62.

The transition member is secured in spaced relation to the lower portions of the first body member and the second exterior body member by means of clamping flanges 64 secured, respectively, to the transition member and to the lower portion of the second exterior body member.

Spacer members are adapted to be provided between the clamping flanges so as to lower the transition member with respect to the lower end of the first body member and second exterior body member in order to increase the size of the annular opening 48.

The interstage separator successfully transfers hot rubber particles in the first stage air stream from the first stage pneumatic conveyor to the second stage pneumatic conveyor with cool dry second stage air, without fouling of the equipment with the hot sticky rubber. As previously noted, rubber crumb entrained in hot wet first stage air of the first stage pneumatic conveyor is delivered to the separating chamber of the interstage separator through the tangential inlet for separation of the rubber particles from the first stage air. Cool dry second stage air is introduced through the second stage inlet into the annular opening 48, picking up the separated rubber particles as they exit from the solids discharge, and transporting them to the second stage pneumatic conveyor in the cool dry second stage air stream. The first stage air is withdrawn from the interstage separator through the exhaust passage. Pressure drop in the second stage pneumatic conveyor backpressures the interstage separator, forcing the first stage air to leave via the exhaust. The exhaust rate is intended to be regulated by means of a valve to be equal to or less than the inlet rate of the first stage air. If the available pressure is insufficient to push out the first stage air, a suction device may be included at the exhaust.

The vortex characteristic of the interstage separator ensures that some of the first stage air is constantly moving proximate the solids discharge so as to prevent fouling. Additionally, the transition member is not prone to fouling because of the high air velocity of the second stage air along its walls. At high exhaust rates, fouling is a potential problem because the velocity of the rubber is so low at the solids discharge that the hot particles stick very easily to the separator walls. This problem is adapted to be overcome by means of the cooling effect provided by the cooling fluid. Hence, the subject invention contains no moving parts to foul, and the rubber particles are kept moving at all times to reduce fouling potential.

Second stage conveying air flow rates need only be sufficient to pneumatically convey the particles. The efficiency with which the first and second stage fluid streams are kept separate depends upon the fluid flow rates and the equipment sizing.

While the invention has been described in connection with a preferred embodiment, it is apparent that various modifications and changes may be made to the the present invention without departing from the spirit and scope of the invention as defined in the appended claims.

What is claimed is:

1. An interstage separator for receiving rubber crumb from a first stage pneumatic conveyor with a wet hot first stage air stream and for transferring said rubber crumb from said wet hot first stage air stream to a dry cool second stage air stream of a second stage pneumatic conveyor comprising a vertically oriented body member having an upper end and a lower end, said body member defining an enclosed separating chamber, said separating chamber being subject to positive pressure, a tangential inlet provided in said upper end, said inlet being adapted to direct said rubber crumb and said wet hot air from said first stage pneumatic conveyor into said separating chamber, said rubber crumb being adapted to be separated from said wet hot first stage air in said separating chamber, a solids discharge at said lower end of said body member through which said separated rubber crumb is adapted to be discharged, exhaust means provided in said upper end of said body member for exhausting said wet hot first stage air from said separating chamber, a cone-shaped transition member surrounding said lower end of said body member, said transition member being secured to said body member and disposed in spaced relation to said lower end so as to define an annular opening between said lower end and said transition member, said transition member being adapted to be raised or lowered with respect to said lower end so as to vary the size of said annular opening, a second stage air inlet provided in said transition member in communication with said annular opening, said second stage air inlet being adapted to communicate with a source of said dry cool air, said second stage air inlet being adapted to introduce said dry cool second stage air into said annular opening, said annular opening being adapted to evenly distribute said dry cool second stage air within said transition member, said dry cool second stage air being adapted to pick up said separated rubber crumb which is discharged through said solids discharge, said transition member being adapted to direct said separated rubber crumb in said dry cool second stage air stream to said second stage pneumatic conveyor.

2. The interstage separator of claim 1 wherein said body member comprises a cyclone separator.

3. The interstage separator of claim 1 wherein said transition member is provided with an anti-fouling coating.

4. The interstage separator of claim 1 wherein around about 99% of said crumb is discharged through said solids discharge.

5. The interstage separator recited in claim 1 wherein around about 90% of said first stage air is separated from said crumb in said separating chamber.

6. The interstage separator of claim 1 further comprising valve means operationally associated with said exhaust means, said valve means being adapted to regulate the exhaust rate of said first stage air from said separating chamber.

7. The interstage separator of claim 1 wherein the size of said annular opening is adapted to be varied.

8. The interstage separator of claim 1 further comprising valve means operationally associated with said exhaust means, said valve means being adapted to regulate the exhaust rate of said first stage air from said separating chamber.

9. An interstage separator for receiving hot rubber crumb from a first stage pneumatic conveyor in a wet hot first stage air stream and for transferring said hot rubber crumb from said wet hot first stage air stream to a dry cool second stage air stream of a second stage pneumatic conveyor comprising a cyclone separator having an upper end and a cone-shaped lower end, said cyclone separator defining a generally enclosed separating chamber, said separating chamber being subject to positive pressure, a tangential inlet provided in said upper end, said inlet being adapted to direct said hot rubber crumb and said wet hot first stage air from said first stage pneumatic conveyor into said separating chamber, said hot rubber crumb being adapted to be separated from said wet hot first stage air in said separating chamber, a solids discharge at said lower end of said cyclone separator through which said separated hot rubber crumb is adapted to be discharged, exhaust means provided in said upper end of said cyclone separator for exhausting said wet hot first stage air from said cyclone separator, said cyclone separator being generally enclosed by an exterior body member disposed in spaced relation to said cyclone separator so as to define a space between said exterior body member and said cyclone separator, said exterior body member being provided with at least one cooling fluid inlet communicating with said space, said cooling fluid inlet being adapted to introduce cooling fluid into said space, a cone-shaped transition member surrounding said exterior body member at said lower end of said cyclone separator, said transition member being secured to and disposed in spaced relation to said exterior body member so as to define an annular opening between said exterior body member and said transition member, said transition member being adapted to be raised or lowered with respect to said exterior body member so as to vary the size of said annular opening, a second stage air inlet provided in said transition member in communication with said annular opening, said second stage air inlet being adapted to communicate with said dry cool air, said second stage air inlet being adapted to introduce said dry cool second stage air into said annular opening, said annular opening being adapted to evenly distribute said dry cool second stage air within said transition member, said dry cool second stage air stream being adapted to provide constantly moving second stage air within said transition member, said dry cool second stage air stream being adapted to pick up said separated hot rubber crumb which is discharged through said solids discharge, said transition member being adapted to direct said separated rubber crumb in said dry cool second stage air stream to said second stage pneumatic conveyor.

10. The interstage cyclone of claim 9 wherein said exhaust means comprises an enclosed exhaust passage communicating with said upper end of said cyclone separator, said enclosed exhaust passage being provided with an exterior sleeve disposed in spaced relation to said exhaust passage so as to define a space between said sleeve and said exhaust passage, said sleeve being provided with an inlet, said inlet being adapted to introduce cooling fluid into said space between said sleeve and said exhaust passage.

11. The interstage separator of claim 9 wherein said transition member is secured to said exterior body member by means of a pair of associated securing flanges, one of said flanges being provided on said exterior body member, the other of said flanges being provided on said transition member.

12. The interstage separator of claim 11 wherein said means for raising or lowering said transition member with respect to said exterior body member comprises at least one spacer member, said spacer member being adapted to be disposed between said securing flanges.

* * * * *